(12) United States Patent
Krull

(10) Patent No.: US 12,223,240 B2
(45) Date of Patent: Feb. 11, 2025

(54) DEVICE AND METHOD FOR EARPIECE DESIGN

(71) Applicant: GN Hearing, Ballerup (DK)

(72) Inventor: Vidya Krull, Highland Park, IL (US)

(73) Assignee: GN HEARING A/S, Ballerup (DK)

(*) Notice: Subject to any disclaimer, the term of this patent is extended or adjusted under 35 U.S.C. 154(b) by 796 days.

(21) Appl. No.: 17/367,293

(22) Filed: Jul. 2, 2021

(65) Prior Publication Data

US 2021/0334439 A1 Oct. 28, 2021

(51) Int. Cl.
*G06F 30/23* (2020.01)
*G06F 30/17* (2020.01)
*H04R 1/10* (2006.01)

(52) U.S. Cl.
CPC .......... *G06F 30/23* (2020.01); *G06F 30/17* (2020.01); *H04R 1/1091* (2013.01)

(58) Field of Classification Search
CPC ........ G06F 30/23; G06F 30/17; H04R 1/1091
See application file for complete search history.

(56) References Cited

U.S. PATENT DOCUMENTS

| | | | |
|---|---|---|---|
| 8,032,337 B2 | 10/2011 | Deichmann et al. | |
| 9,706,282 B2 | 7/2017 | Burgett et al. | |
| 2004/0107080 A1 | 6/2004 | Deichmann et al. | |
| 2006/0239483 A1 | 10/2006 | Orts et al. | |
| 2010/0296664 A1 | 11/2010 | Burgett et al. | |
| 2011/0290005 A1 | 12/2011 | Hart et al. | |
| 2013/0182882 A1* | 7/2013 | Hart | A61B 5/0073 703/1 |
| 2015/0382123 A1 | 12/2015 | Jobani | |
| 2020/0302099 A1 | 9/2020 | Grenier et al. | |
| 2021/0334439 A1 | 10/2021 | Krull | |
| 2022/0070596 A1 | 3/2022 | Dahl et al. | |
| 2023/0039728 A1* | 2/2023 | Shonibare | G06Q 50/22 |

FOREIGN PATENT DOCUMENTS

| | | |
|---|---|---|
| EP | 3879852 | 9/2021 |
| WO | WO 2007/087633 | 8/2007 |
| WO | WO 2011/046508 | 4/2011 |

OTHER PUBLICATIONS

Kinsella P. Analysis and design of in-ear devices. Diss. Swinburne University of Technology. Oct. 23, 2018. (Year: 2018).*
Technical examination report for Danish patent application No. PA 2021 70465 dated Dec. 16, 2021.
Technical examination report for Danish patent application No. PA 2021 70466 dated Dec. 16, 2021.
Final Office Action for U.S. Appl. No. 17/368,746 dated Sep. 14, 2023.
Non-Final Office Action for U.S. Appl. No. 17/368,746 dated Mar. 21, 2024.
Non-Final Office Action for U.S. Appl. No. 17/368,746 dated Mar. 9, 2023.

* cited by examiner

*Primary Examiner* — Chuen-Meei Gan
(74) *Attorney, Agent, or Firm* — Vista IP Law Group, LLP

(57) ABSTRACT

A method of predictive design of an earpiece for a user, includes: obtaining 3D scan data of an ear; obtaining a model earpiece with an earpiece configuration based on an analysis of the 3D scan data; determining coupling data indicative of a coupling of the model earpiece; evaluating the earpiece configuration based on the coupling data; and providing a personalized earpiece based on an output of the evaluation.

20 Claims, 3 Drawing Sheets

DEVICE AND METHOD FOR EARPIECE DESIGN

FIELD

The present disclosure relates to a hearing device and related methods including a method for design of an earpiece and in particular to a method for predictive earpiece design.

BACKGROUND

In the field of hearing devices, fit of components of the hearing devices, such as earpieces, is important. Providing a user with a poorly fitting earpiece can waste time, both of the user and the manufacturer, as well as providing negative feedback to the user. Further, as newer earpiece designs are tailored specifically to a given user, a poorly fitting earpiece may be wasted.

Accordingly, there is a need for methods for better predicting earpiece designs for consumer fit utilizing finite element analysis of 3D scan data.

SUMMARY

Accordingly, there is a need for methods for better predicting earpiece designs for consumer fit.

A method of predictive design of an earpiece for a user is disclosed. The method can include obtaining 3D scan data of an ear. The method can include obtaining a model earpiece. The model earpiece can have an earpiece configuration. The earpiece configuration can be based on finite element analysis of the 3D scan data. The method can include determining coupling data. The coupling data can be indicative of a coupling of the model earpiece. The method can include evaluating the earpiece configuration. The evaluating can be based on the coupling data. The method can include providing a personalized earpiece based on an output of the evaluation.

The present disclosure provides for methods and devices for designing a personalized earpiece, such as for a hearing device, using comfort parameters from finite element analysis to alleviate and/or prevent user discomfort. Thus, one or more exemplary methods can take actions to increase the probability of comfort of an earpiece design prior to a user wearing the earpiece, reducing the rejection rate of the earpiece.

For example, the method can provide for a method which can analyze probabilities of comfort for a model earpiece using one or more parameters determined by finite element analysis. By predicting user comfort in the design phase, this can reduce overall development and manufacturing costs such as by eliminating likely uncomfortable earpieces. Further, the disclosed methods avoid subjective testing, which is time consuming and expensive. Moreover, by creating individualized designs, the disclosed methods offer maximum chances of acceptance for a first fit of a user. Additionally, modelling of ear dynamics can be incorporated into the method, improving earpiece, and overall hearing device, performance.

Also disclosed is an electronic device comprising one or more processors, memory, and an interface, wherein the one or more processors are configured to obtain 3D scan data of an ear; obtain a model earpiece with an earpiece configuration based on an analysis of the 3D scan data; determine coupling data indicative of a coupling of the model earpiece; evaluate the earpiece configuration based on the coupling data; and obtain a personalized earpiece based on an output of the evaluation.

A method of predictive design of an earpiece for a user, includes: obtaining 3D scan data of an ear; obtaining a model earpiece with an earpiece configuration based on an analysis of the 3D scan data; determining coupling data indicative of a coupling of the model earpiece; evaluating the earpiece configuration based on the coupling data; and providing a personalized earpiece based on an output of the evaluation.

Optionally, the method is performed prior to providing an initial earpiece to the user.

Optionally, the 3D scan data is based on a 3D scan of an impression of the ear.

Optionally, the 3D scan data is based on a 3D scan of the ear.

Optionally, the 3D scan data comprises front pinna data, back pinna data, and ear canal data.

Optionally, the act of obtaining the model earpiece comprises obtaining an initial model earpiece based on the analysis.

Optionally, the initial model earpiece is the model earpiece.

Optionally, the act of obtaining the model earpiece also comprises determining one or more contact force parameters based on the initial model earpiece; and wherein the method also comprises modifying the initial model earpiece to a first model earpiece based on the one or more contact force parameters.

Optionally, the act of obtaining the model earpiece comprises determining one or more pressure parameters based on the initial model earpiece; and wherein the method also comprises modifying the initial model earpiece to a first model earpiece based on the one or more pressure parameters.

Optionally, the act of obtaining the model earpiece further comprises modifying the initial model earpiece to a first model earpiece.

Optionally, the first model earpiece is the model earpiece.

Optionally, the act of determining the coupling data comprises analyzing comfort criteria of the first model earpiece.

Optionally, the act of analyzing the comfort criteria is performed based on one or more pressure parameters associated with the first model earpiece and/or based on one or more contact force parameters associated with the first model earpiece.

Optionally, the act of evaluating the earpiece configuration comprises validating the first model earpiece with the user.

Optionally, the act of determining the coupling data comprises modelling one or more ear canal dynamics.

Optionally, the one or more ear canal dynamics includes jaw opening and closing performance, chewing performance, head movement performance, or a combination of the foregoing.

Optionally, the act of evaluating the earpiece configuration comprises determining whether the coupling data satisfies one or more criteria including a first criterion based on a first threshold.

Optionally, the method further comprises including the earpiece configuration into a fine-tuning data set if the coupling data does not satisfy the first criterion.

Optionally, the analysis of the 3D scan data comprises a finite element analysis of the 3D scan data.

Optionally, the personalized earpiece comprises a digital personalized earpiece.

An electronic device includes one or more processors, memory, and an interface, wherein the one or more processors are configured to: obtain 3D scan data of an ear; obtain a model earpiece with an earpiece configuration based on an analysis of the 3D scan data; determine coupling data indicative of a coupling of the model earpiece; evaluate the earpiece configuration based on the coupling data; and provide a personalized earpiece based on an output of the evaluation.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which.

DETAILED DESCRIPTION

Figure 1:
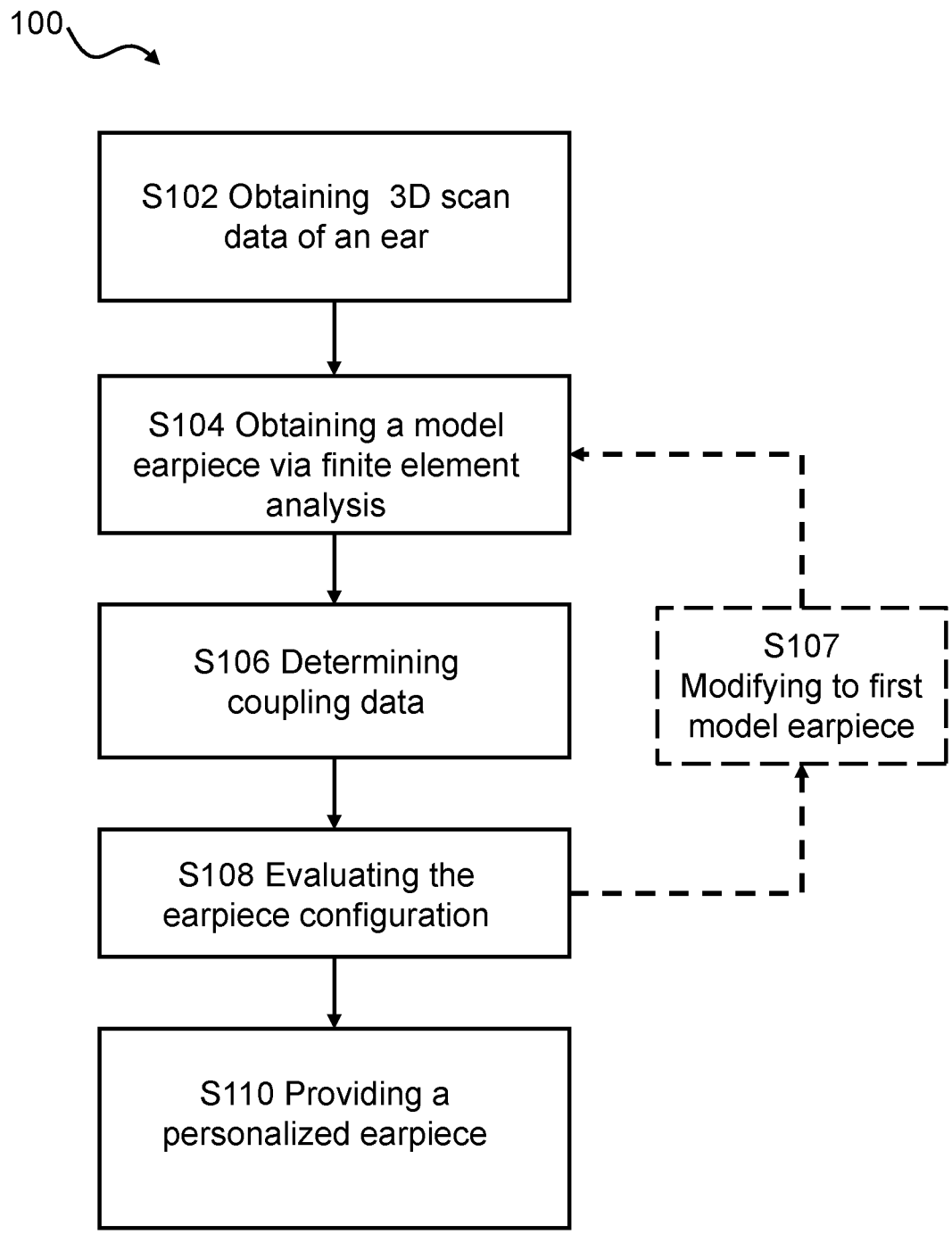
FIG. 1 illustrates an exemplary method of the disclosure.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Methods for predicting an earpiece and/or hearing device design and/or ear molds are disclosed herein. The methods can be used to predict and/or optimize comfort. For example, the methods may be advantageous in optimizing comfort of an earpiece and/or hearing device design, such as for occlusion, passive and active noise cancellation, and reduced feedback. The earpiece may be a component of the hearing device, and vice versa. The hearing device may be configured to be worn at an ear of a user and may be a hearable or a hearing aid, wherein the processing unit is configured to compensate for a hearing loss of a user. The methods may make devices physically comfortable, or more comfortable, to wear, and may allow for improved compliance for a user wearing the earpiece, thereby improving hearing protection and avoiding hearing loss.

The hearing device may be of the behind-the-ear (BTE) type, in-the-ear (ITE) type, in-the-canal (ITC) type, receiver-in-canal (RIC) type, receiver-in-the-ear (RITE) type, or microphone-and-receiver-in-the-ear (MaRie) type. The hearing aid may be a binaural hearing aid.

The hearing device may be configured for wireless communication with, e.g. reception of wireless signals from and/or transmission of wireless signals, such as control signals, to one or more devices, such as with another hearing device, e.g. as part of a binaural hearing system, and/or with one or more accessory devices, such as a smartphone and/or a charging device and/or a smart watch. The hearing device optionally comprises an antenna for converting one or more wireless input signals, e.g. a first wireless input signal and/or a second wireless input signal, to antenna output signal(s). The wireless input signal(s) may origin from external source(s), such as spouse microphone device(s), wireless TV audio transmitter, and/or a distributed microphone array associated with a wireless transmitter. The wireless input signal(s) may origin from another hearing device, e.g. as part of a binaural hearing system, and/or from one or more accessory devices.

The hearing device optionally comprises a wireless transceiver or radio transceiver e.g. also denoted or forming part of magnetic induction unit, coupled to the antenna (e.g. as part of the magnetic induction unit) for converting the antenna output signal to a transceiver input signal. Wireless signals from different external sources may be multiplexed in the radio transceiver to a transceiver input signal or provided as separate transceiver input signals on separate transceiver output terminals of the radio transceiver. The hearing device may comprise a plurality of antennas and/or an antenna may be configured to be operate in one or a plurality of antenna modes. The transceiver input signal optionally comprises a first transceiver input signal representative of the first wireless signal from a first external source.

The hearing device optionally comprises a set of microphones. The set of microphones may comprise one or more microphones. The set of microphones comprises a first microphone for provision of a first microphone input signal and/or a second microphone for provision of a second microphone input signal. The set of microphones may comprise N microphones for provision of N microphone signals, wherein N is an integer in the range from 1 to 10. In one or more exemplary hearing devices, the number N of microphones is two, three, four, five or more. The set of microphones may comprise a third microphone for provision of a third microphone input signal. The set of microphones may provide one or more input signals to the processing unit. The processing unit may process input signal(s) from the one or more microphones and/or optionally a radio transceiver. The processing unit may provide an output signal to a receiver, such as an output transducer, for conversion to an audio output signal.

The hearing device comprises a processing unit for processing input signals, such as (optionally pre-processed) transceiver input signal(s) from magnetic induction unit and/or (optionally pre-processed) microphone input signal(s) from the microphone(s). The processing unit is optionally configured to compensate for hearing loss of a user of the hearing device. The processing unit provides an electrical output signal based on the input signals to the processing unit.

As mentioned, disclosed herein are methods for predictive design of an earpiece. The earpiece can be used as, for example, a component in a hearing device. Thus, as an example, the earpiece can be incorporated into a hearing device as discussed above.

A method of predictive design of an earpiece for a user is disclosed. The method can, for example, predict and/or optimize comfort. The earpiece can be a hearing device, or a component of a hearing device. The method can be performed prior, or after, the user receives an earpiece for a fitting.

In one or more exemplary methods, the method comprises obtaining 3D scan data of an ear. The 3D scan can be of the inside and/or the outside of the ear. The 3D scan data can be representative of surface(s) of the user's ear, such as biological surfaces of the ear and/or components attached to the ear. The 3D scan data may be configured to be stored and/or transmitted.

In one or more exemplary methods, the method comprises obtaining a model earpiece. The model earpiece may be physical or digital. The model earpiece may be a digital representation of a physical earpiece.

The model earpiece can have an earpiece configuration. The earpiece configuration can include, for example, one or more of: dimensions, materials, flexibility, and parameters of the model earpiece.

The earpiece configuration can be based on finite element analysis of the 3D scan data. The finite element analysis may be configured to be a representation of a user's ear. The earpiece configuration can incorporate data other than the finite element analysis as well.

In one or more exemplary methods, the method comprises determining coupling data. The coupling data can be indicative of a coupling of the model earpiece. For example, the coupling can be a coupling with a user. The coupling can be a fit of the model earpiece with a user. The coupling can be a comfort of the model earpiece with a user. The coupling data can be indicative of a prediction of a coupling of the model earpiece.

In one or more exemplary methods, the method comprises evaluating the earpiece configuration. The evaluating can be based on the coupling data. The evaluating can be performed electronically. The evaluating can be performed by a person. The evaluating can utilize the coupling data. The evaluating can include more data than the coupling data. The evaluating can include data from the user. The evaluating can include predicting and/or optimizing comfort of the earpiece. The evaluating can be stored, such as in a database.

In one or more exemplary methods, the method comprises providing a personalized earpiece based on an output of the evaluation. The personalized earpiece may be the final earpiece of the method. The personalized earpiece may be an intermediate earpiece of the method. The personalized earpiece may be a physical and/or digital earpiece. The personalize earpiece may be a representation of a physical earpiece. The providing may be providing a digital personalized earpiece. The providing may include manufacturing the personalized earpiece.

Producing personalized earpieces for use in a hearing device for a user can be a long, expensive, and time-consuming process. This process typically can include one or more fittings of a user to develop a properly fitted earpiece created by a technician. This can waste significant time and resources for both the user and the technician, having to repeat the process multiple times. Further, a user can be frustrated in having to travel to a hearing aid specialist facility a number of times, only to have the earpieces not fit well.

It can be advantageous to filter out likely poor fitting earpieces prior to investing time and effort into producing an earpiece for a user. Accordingly, disclosed herein are one or more exemplary methods which use information about a user to produce an earpiece with a high probability of fitting. For example, finite element analysis can be used to develop one or more comfort criteria/parameters for the earpiece. Candidate designs can be tested, modified as necessary, and thus earpieces that have a comfortable prediction are developed, reducing product development costs.

In one or more exemplary methods, the method can utilize a database of previously used and/or known earpieces to determine, and therefore assist in producing, an earpiece with a high likelihood of fitting a user. The database can continuously be updated and/or fine-tuned based on objective and/or subjective data from the user.

Advantageously, all or part of the of the disclosed method can be performed prior to providing an initial earpiece to the user. Thus, a user will not have to come to multiple fittings to properly receive an earpiece and hearing device.

Accordingly, one or more of the disclosed methods can use parameters, as discussed below, to prepare an earpiece having a high likelihood of fitting the user. While iteration of the method may be used, it can all be performed without a user being required to have a fitting. In one or more exemplary methods, the first earpiece a user receives will have a high probability, e.g. high likelihood, of properly fitting the user. In one or more exemplary methods, the first earpiece a user receives will properly fit the user. In one or more exemplary methods, only minor adjustments may be needed to fit the earpiece to a user.

Alternatively, in one or more exemplary methods, all or part of the disclosed method can be performed while using one or more fittings with a user. This still may reduce the number of fittings required by the user as compared to standard techniques. For example, one or more exemplary methods can use 0, 1, 2, 3, 4, or 5 fittings. In one or more exemplary methods, the method can use less than 1, 2, 3, 4, or 5 fittings. In one or more exemplary methods, the method can use greater than 0, 1, 2, 3, 4, or 5 fittings.

In one or more exemplary methods, an analysis can be performed on a user. The analysis can include modeling, such as via one or more procedures of the user. The procedure can include one or more scans. For example, one or more scans can be performed on a user's ear. In one or more exemplary methods, a 3D scan can be performed on an ear of a user. However, the particular scan is not limiting, and other scans can be used as well. The one or more scans can be used to determined data on a user's ear such as, for example, shape, size, dimensions, proportions, relationships of components.

The 3D scanning can be performed on one or more parts of the user. The 3D scanning can be performed on the user's ear to obtain 3D scan data. The 3D scanning can be performed on the user's head to obtain 3D scan data. The 3D scanning can be performed on the user's ear and head to obtain 3D scan data. In one or more exemplary methods, the 3D scan data can include front pinna data. In one or more exemplary methods, 3D scan data can include back pinna data. In one or more exemplary methods, 3D scan data can include ear canal data. In one or more exemplary methods, the 3D scan data can include back pinna data, front pinna data, and ear canal data. In one or more exemplary methods, the 3D scan data can include back pinna data and/or front pinna data and/or ear canal data.

The 3D scan data can include more of the user than just the ear. For example, the 3D scan data can include further data on the user's head, such as the user's jaw and/or hair and/or skull and/or nose.

The 3D scan data can be obtained through a number of methods. In one or more exemplary methods, 3D scan data can be obtained by performing a 3D scan on the ear of a user. Accordingly, the 3D scan can be performed directly on the user.

In one or more exemplary methods, 3D scan data can be obtained by performing a 3D scan on an impression of the ear of a user. Thus, an ear impression of the user can be manufactured first. From the ear impression, a 3D scan can be taken.

In one or more exemplary methods, the method can include obtaining a model earpiece. The model earpiece can include an earpiece configuration. The model earpiece can be configured for a hearing device. The earpiece configuration can be based on the 3D scan data.

The earpiece configuration can be based on finite element analysis (FEA) of the 3D scan data. Thus, fine element analysis can be performed with respect to the 3D scan data. For example, software and/or hardware can be used to obtain the model earpiece. The finite element analysis may be based on a finite element method (FEM) used on the 3D scan data. In one or more exemplary methods, the obtaining a model earpiece comprises obtaining an initial model earpiece based on the finite element analysis. The earpiece configuration can be based fully on the 3D scan data. The earpiece configuration can be based partially on the 3D scan data.

In one or more exemplary methods, the method can use characteristics of earpieces. For example, the method can use material characteristics of earpieces previously determined. The previously determined earpieces can be, for example, in a database.

In one or more exemplary methods, the method can use technical and/or engineering drawings and/or files. For example, the method can use computer-aided design (CAD) files of earpieces and/or user's ears. Other types of files can be used as well. In one or more exemplary methods, the files can be volume files. The volume files can be generated using software. The volume files can be prepared from 3D scanning software. For example, the volume files can be prepared from stitched scans made available through 3D scanning software.

In one or more exemplary methods, the method can use specific boundary conditions to apply on model earpieces prior to data evaluation.

The method can include one or more of the following steps. However, alternative procedures can be used as well, and the disclosure is not so limiting.

In one or more exemplary methods, the method can include importing models of earpieces and/or ear geometries into FEA software, e.g. executed in a computing or data processing device. The models can be on any usable medium and/or software, such as CAD files.

In one or more exemplary methods, the method can include defining parameters, such as geometrical parameters. This can be performed through user input. This can be performed via software. This can be performed automatically. In one or more exemplary methods, the method can include defining material properties for the ear and/or earpieces.

In one or more exemplary methods, the method can include assembling a model earpiece. The assembling can include position constraints of the ear and/or the earpiece.

In one or more exemplary methods, the method can include creating one or more time steps in a model earpiece specific to insertion of the earpiece into the user's ear.

In one or more exemplary methods, the method can include combining, such as meshing, organizing, categorizing, components and/or parts of the data, such as the model earpiece, together.

In one or more exemplary methods, the method can include defining constraints and/or defining contact interactions between a user's ear and a model earpiece.

In one or more exemplary methods, the method can include defining boundary conditions of the analysis. This can be performed through user input. This can be performed via software. This can be performed automatically.

In one or more exemplary methods, the method can include analyzing the model earpiece. For example, the analyzing can be the analyzing discussed herein, such as by using the coupling data.

In one or more exemplary methods, the method can include extracting. For example, the method can include extracting surface outputs. The method can include performing post-processing. This can allow for evaluation, for example which can include input/data from the user regarding comfort as discussed herein. The extraction can be output.

In one or more exemplary methods, the method, the method can offer visualization to aid understanding of deformation from a mechanical aspect. The method can include providing the visualization as an output.

The model earpiece can be a physical earpiece. The model earpiece can be a digital earpiece. For example, a data representation of the model earpiece can be stored and/or configured for transmission. The model earpiece may be configurable to be modified, such as by a technician or other user. The model earpiece can include some or all physical parameters of the model earpiece, such as size, shape, dimensions, etc. Thus, for example, the FEA can be used to model a user's ear. Further, the FEA can be used to model an earplug. The FEA can be used to model a hearing device. The FEA can be used to model an earpiece.

In one or more exemplary methods, the 3D data can be obtained via receiving the data from the user. For example, the user can electronically or physically provide the 3D data. Alternatively, a facility that previously performed a 3D scan, whether of the patient's ear directly or on an impression of the patient's ear, can be provided by the facility.

Thus, in one or more exemplary methods, the method can include performing a 3D scan to obtain 3D scan data of the user's ear and/or head. Alternatively, the method can include receiving 3D scan data on the user's ear and/or head without performing the actual 3D scan.

The 3D scanning can be performed in a clinic and/or a dispenser's office, as an example. A hand-held scanner can be used. The clinician and/or provider can provide the 3D data. The clinician and/or provider can further provide a user's hearing thresholds.

In one or more exemplary methods, the obtaining a model earpiece can include determining one or more parameters of the model earpiece. In one or more exemplary methods, the obtaining a model earpiece can include determining one or more initial contact force parameters, e.g. contact force parameters. The initial contact force parameters can be based on the initial model earpiece. The evaluating the earpiece configuration can include modifying the initial earpiece to a first model earpiece. For example, the obtaining a model earpiece can include modifying the initial model earpiece to a first model earpiece based on the one or more initial contact force parameters.

The one or more contact force parameters can be indicative of the amount of contact force a model earpiece and/or an earpiece configuration would place on the user's ear. FEA can be used to determine the one or more contact force parameters.

In one or more exemplary methods, the obtaining a model earpiece can include determining one or more parameters of the model earpiece. The one or more parameters can be physical parameters. In one or more exemplary methods, the obtaining a model earpiece can include determining one or more initial pressure parameters, e.g. pressure parameters. The initial pressure parameters can be based on the initial model earpiece. The evaluating the earpiece configuration can include modifying the initial earpiece to a first model earpiece. For example, the obtaining a model earpiece can include modifying the initial model earpiece to a first model earpiece based on the one or more initial pressure parameters.

The one or more pressure parameters can be indicative of the amount of pressure a model earpiece and/or an earpiece configuration would place on the user's ear. FEA can be used to determine the one or more pressure parameters.

In one or more exemplary methods, the obtaining a model earpiece can include determining one or more parameters of the model earpiece. In one or more exemplary methods, the obtaining a model earpiece can include determining one or more initial contact surface area parameters, e.g. contact surface area parameters. The initial contact surface area parameters can be based on the initial model earpiece. The obtaining a model earpiece can then include modifying the initial earpiece to a first model earpiece. For example, the obtaining a model earpiece can include modifying the initial model earpiece to a first model earpiece based on the one or more initial contact surface area parameters.

The one or more contact surface area parameters can be indicative of the amount of contact surface area a model earpiece and/or an earpiece configuration would experience with the user's ear. FEA can be used to determine the one or more contact surface area parameters.

In one or more exemplary methods, the one or more pressure parameters can be calculated from the one or more contact force parameters and/or the one or more contact surface area parameters. In one or more exemplary methods, the one or more pressure parameters can be calculated from the one or more contact force parameters and the one or more contact surface area parameters. In one or more exemplary methods, the one or more pressure parameters can separate from, and therefore not based on, the one or more contact force parameters and/or the one or more contact surface area parameters.

Once a model earpiece has been obtained, one or more exemplary methods can include determining coupling data. The coupling data, e.g. comfort data, comfort parameters, comfort criteria, can be indicative of a coupling, e.g. comfort, insertion, feel, contact, pressure, attachment, holding, retaining of the model earpiece. In particular, the coupling data can be indicative of a coupling of the model earpiece in and/or around a user's ear. The coupling data can be used to determine whether there is a likelihood, e.g. probability, of the earpiece fitting or not fitting the user as discussed below. In one or more exemplary methods, the coupling data can include the comfort criteria.

In one or more exemplary methods, the determining coupling data can include analyzing comfort criteria. The comfort criteria can be of the model earpiece. The comfort criteria can be of the first model earpiece. The comfort criteria can be of a second, third, fourth, fifth, etc. model earpiece. The comfort criteria can be based on one or more pressure parameters.

The comfort criteria can be based on one or more first pressure parameters, e.g. one or more pressure parameters, such as those associated with the model earpiece and/or the first model earpiece. The comfort criteria can be based on one or more first contact force parameters, e.g. one or more contact force parameters, such as those associated with the model earpiece and/or the first model earpiece. The comfort criteria can be based on one or more first contact surface area parameters, e.g. one or more contact surface area parameters, such as those associated with the model earpiece and/or the first model earpiece. The comfort criteria can be based on one or more first pressure parameters associated with the model earpiece and/or the first model earpiece and/or based on one or more first contact force parameters associated with the model earpiece and/or the first model earpiece. and/or based on one or more first contact surface area parameters associated with the model earpiece and/or the first model earpiece.

Having proper comfort for a user can be advantageous for the use of an earpiece. Earpieces are used for long periods of time, and comfort is a major factor affecting user compliance of hearing protection. Accordingly, if an earpiece was not sufficiently comfortable, a user may not use an earpiece, or use it improperly. Thus, one or more exemplary methods can provide for a comfortable earpiece to a user.

In one or more exemplary methods, the coupling data can include the one or more contact force parameters. In one or more exemplary methods, the coupling data can include the one or more pressure parameters. In one or more exemplary methods, the coupling data can include the one or more contact surface area parameters. In one or more exemplary methods, the coupling data can include the one or more contact force parameters and the one or more pressure parameters and the one or more contact surface area parameters. In one or more exemplary methods, the coupling data can include the comfort criteria. The comfort criteria can be based, or be indicative of, the one or more pressure parameters and/or the one or more contact force parameters and/or the one or more contact surface area parameters.

In one or more exemplary methods, the one or more pressure parameters can be predicted and/or modelled using FEA. In one or more exemplary methods, the one or more contact force parameters can be predicted and/or modelled using FEA. In one or more exemplary methods, the one or more contact surface area parameters can be predicted and/or modelled using FEA.

In one or more exemplary methods, the coupling data can include the one or more pressure parameters, the one or more contact force parameters, and/or the one or more contact surface area parameters. In one or more exemplary methods, the coupling data and/or the comfort criteria can include further data and/or information. For example, advantageously the method can utilize FEA of the 3D scan data to model ear canal dynamics. For example, further FEA can be used in conjunction with modelling and/or machine learning and/or artificial intelligence to determine ear canal dynamics. Thus, the determining coupling data can include modelling ear canal dynamics of the first model earpiece.

The ear canal dynamics can be advantageous for modelling how a given earpiece would operate, fit, be comfortable, etc. during certain user motions. In one or more exemplary methods, the ear canal dynamics can include jaw opening performance. In one or more exemplary methods, the ear canal dynamics can include jaw closing performance. In one or more exemplary methods, the ear canal dynamics can include chewing performance. In one or more exemplary methods, the ear canal dynamics can include head movement performance. In one or more exemplary methods, the ear canal dynamics can include jaw opening and/or closing performance and/or chewing performance and/or head movement performance.

In one or more exemplary methods, the model earpiece can be modified. For example, the model earpiece can be modified to a first model earpiece. The first model earpiece can then be modified to a second model earpiece, etc. Each model earpiece, such as the model earpiece, first model earpiece, second model earpiece, etc., can include the coupling data as discussed above. Subsequent model earpieces can be combinations of previous earpieces.

The model earpiece can be modified based on the one or more contact force parameters. For example, FEA can be used to model the contact force of the particular earpiece. The model earpiece can be modified based on the one or more pressure parameters. For example, FEA can be used to model the pressure of the particular earpiece. The model earpiece can be modified based on the one or more contact surface area parameters. For example, FEA can be used to model the contact surface area of the particular earpiece.

Thus, if the method determines that based on any of the above parameters, the earpiece would likely not be comfortable, the method can modify the model earpiece to a first model earpiece having different parameters. The method may do so any number of times before proceeding to the evaluating step, discussed below. Alternatively, any modification may occur after the evaluating step disclosed below.

After coupling data has been determined, the method can include evaluating the earpiece configuration based on the coupling data. As mentioned, the coupling data may include the comfort criteria. The coupling data may include the one or more contact force parameters and/or the one or more pressure parameters and/or the one or more contact surface area parameters. The earpiece configuration may be for the model earpiece, for a first model earpiece, for a second model earpiece, or for any model earpiece obtained during the method, depending on the current iteration of the method In one or more exemplary methods, the evaluating, e.g. validating, an earpiece configuration can include determining wither the coupling data satisfies one or more criteria. For example, the one or more criterion can be based on a first threshold. In accordance with determining that the coupling data not satisfying the first criterion, including the earpiece configuration into a fine-tuning data set. In accordance with determining that the coupling data satisfies the first criterion, the method can proceed, such as to the providing a personalized earpiece.

In one or more exemplary methods, the evaluating an earpiece configuration can include validating the model earpiece, such as the first model earpiece and/or the second model earpiece etc., with the user. This can be done by providing a non-finalized earpiece for a user to wear. This can include providing data to the user regarding the model earpiece.

The criteria can be a particular probability of comfort. For example, the criteria can be a probability of comfort of 10, 20, 30, 40, 50, 60, 70, 80, 90, 95, or 100%. The criteria can be a probability of comfort of greater than 10, 20, 30, 40, 50, 60, 70, 80, 90, 95, or 100%. The criteria can be a probability of comfort of less 10, 20, 30, 40, 50, 60, 70, 80, 90, 95, or 100%. Thus, in one or more exemplary methods, the criteria can be indicative a probability, e.g. confidence, that an earpiece may fit comfortably for a user for a given coupling data.

Thus, for example, a criterion of 70% for a criterion of pressure may indicate that there would be a 70% chance that a given model earpiece would have appropriate pressure for a user. Alternatively, a criterion of 70% for a criterion of too loose may indicate that there would be a 30% chance that a given model earpiece would have appropriate pressure for a user.

Each of the coupling data, such as including the one or more contact force parameters and/or the one or more pressure parameters and/or the one or contact surface area parameters, can have a separate criteria, such as a first criteria, a second criteria, or a third criteria, which may include the probabilities discussed above.

For example, a first criteria may be for the one or more pressure parameters. A second criteria may be for the one or more contact force parameters. A third criteria may be for the one or more contact surface area parameters.

In one or more exemplary methods, a criteria, e.g. second criteria, for the one or more contact force parameters may be higher than a criteria, e.g. first criteria, for the one or more pressure parameter. In one or more exemplary methods, the one or more contact force parameters and/or the one or more pressure parameters and/or the one or more contact surface area parameters may all have the same single criteria. In one or more exemplary methods, the one or more pressure parameters may be based on the other two, so the one or more pressure parameters may be the only parameters evaluated.

The criteria may be adjusted by either the provider of the earpiece or the user. For example, if the user finds an initial pressure parameter criteria to be too tight, the method may adjust the criterion for the pressure parameters. Moreover, the provider may determine that an earpiece having improper contact force parameters may be more problematic than an earpiece not having sufficient pressure parameters, and therefore may adjust the respective criterion.

In one or more exemplary methods, if the coupling data and/or the one or more contact force parameters and/or the one or more pressure parameters and/or the one or more contact surface area parameters are above a respective criteria and/or criterion, this may indicate a high likelihood that the model earpiece would have a comfortable fit for the user. In one or more exemplary methods, if the one or more pressure parameters are above the criteria, e.g. the second criteria, this may indicate a high likelihood that the model earpiece would have a comfortable fit for the user.

For example, if the coupling data is above the given criteria, the coupling data may receive a comfort label indicative of comfort. If the second and third misfit parameters are below their respective criteria, they may receive an uncomfort label indicative of uncomfort. If the second and third misfit parameters are below their respective criteria, they may receive an uncomfort label indicative of discomfort. If the second and third misfit parameters are below their respective criteria, they may receive a comfort label indicative of discomfort. If the second and third misfit parameters are below their respective criteria, they may receive a comfort label indicative of uncomfort. Alternatively, the second and third misfit parameters may not receive a label. Thus, they may merely not have a comfort label indicate of comfort.

Accordingly, for each parameter and/or coupling data, the parameter and/or coupling data is compared to the respective criteria as discussed above. If the parameter and/or coupling data is above the respective criteria, this indicates that there is a high likelihood of comfort. Thus, the comfort data and/or parameter would receive an indication, e.g. label, tag, data, indicative of comfort. Alternatively, the parameter and/or coupling data would receive no indication, e.g. label, tag, data, indicative of uncomfort.

If the parameter and/or coupling data is below the respective criteria, this indicates that there is a high likelihood of uncomfort. Thus, the parameter and/or coupling data would receive an indication, e.g. label, tag, data, indicative of uncomfort. Alternatively, the parameter and/or coupling data would receive no indication, e.g. label, tag, data, indicative of comfort.

Further, labelling the model earpiece (and/or first model earpiece and/or second model earpiece etc.) can include physically labelling the model earpiece. For example, the method can include attaching a sticker, e.g. label, attachment, tag, to the model earpiece. In one or more exemplary methods, the method can include putting the model earpiece into a designated container, e.g. box, packaging.

In one or more exemplary methods, the evaluating can compare the particular model earpiece to a database of earpieces. The database may include information on the earpieces which have previously been evaluated and/or validated by other users. Thus, the database can include data on the user, such as 3D scan data, as well as that of the earpieces, such as through the use of FEA. In one or more exemplary embodiments, the database can be used to develop the particular criteria discussed in detail above.

If any of the criterion are not met by the model earpiece, such as for the one or more contact force parameters and/or the one or more pressure parameters and/or the one or more contact surface area parameters, the method can include modifying the model earpiece to a first model earpiece. The first model earpiece can have dimensions different from the model earpiece in order to improve a particular parameter that has not met the criterion. For example, if the one or more pressure parameters fails the criterion as the model earpiece would be too tight, the model earpiece may be modified to a smaller earpiece for the first model earpiece.

This method of modifying can repeat as needed until a particular model earpiece has been evaluating so that all criteria are met. This indicates a high probability of comfort to a user.

Thus, in accordance with the first model earpiece being validated, e.g., the particular model earpiece meeting all of the comfort criteria, the method can include providing the output of the evaluation. This output can be provided to, for example, a technician for preparing a personalized earpiece based on the output. The technician can be a human technician. The technician can be an A.I. technician. Thus, the method can include providing a personalized earpiece based on an output of the evaluation.

Additionally, the particular model earpiece, including any data, may be added into the database discussed above. This can allow more accurate fitting for future methods. Further, acoustical models for testing algorithms, such as occlusion, feedback, and noise, can utilize the database. This can, for example, allow for determining candidature for occlusion cancellation. Further, the database can allow for improved estimation of sound pressure levels (SPL) for high frequencies. As another example, residual volumes can be used to one or more of: estimate occlusion, adjust the gain of the earpiece, and calculate acoustic impedance.

Therefore, a second model earpiece with a second earpiece configuration based on finite element analysis of the 3D scan data can be obtained. Further, the second model earpiece can be obtained using information received from the user during the validation process. As one example, a user may indicate that the first model earpiece is too tight. Therefore, the second model earpiece can be a looser configuration than the first model earpiece.

Further, in accordance with the first model earpiece not being validated by the user, the data on the first model earpiece and its earpiece configuration can be included into a database. For example, the earpiece configuration can be included into a fine-tuning data set. This can be done to assist in any A.I. or machine learning. Further, data on the user as well as the model earpiece can be incorporated into the database.

The method can proceed through any number of iterations. Thus a second, third, fourth, fifth, etc. model earpiece can be obtained.

In one or more exemplary methods, the methods can be performed via a physical device, such as a computer program product. The computer program product can be utilized in, for example, a computer, laptop, mobile phone, table, etc.

In one or more exemplary methods, the computer system can include a computer program product. The computer program product can include a non-transitory computer readable medium. The non-transitory computer readable medium can have stored thereon a computer program. The computer program can include program instructions. The computer program can be loadable into a data processing unit. The computer program can be configured to cause execution of the steps, processes, and/or modules discussed above. For example, when the computer program is run by a data processing unit.

Figure 2:
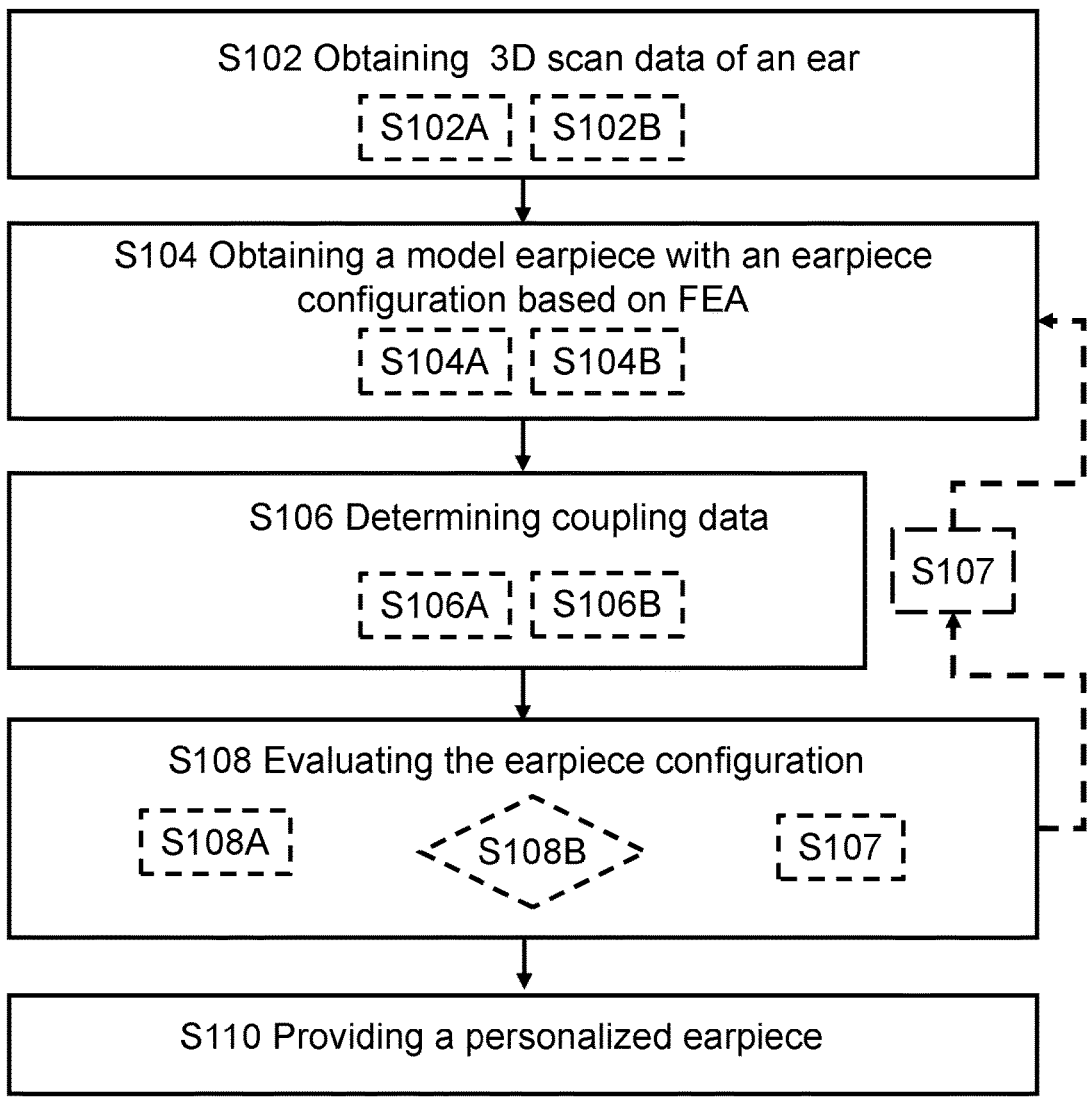
FIG. 2 illustrates an exemplary method of the disclosure.

FIG. 1 and FIG. 2 illustrate example method(s) of predictive earpiece design of an earpiece for a user as disclosed herein.

The method 100 can include obtaining 3D scan data of an ear S102. The obtaining S102 can include performing a 3D scan on an impression of the ear S102A, such as an ear plug, or performing a 3D scan on the ear itself S102B. The 3D scan data can include front pinna data and/or back pinna data and/or ear canal data and/or head data.

Following, the method can include obtaining a model earpiece with an earpiece configuration based on finite element analysis of the 3D scan data S104. The 3D scan can be a static scan. The 3D scan can be a dynamic scan.

While obtaining the model earpiece, S104, the method 100 can determine one or more initial contact force parameters based on the initial model earpiece S104A. Alternatively, or in conjunction with, the method can determine one or more initial pressure parameters based on the initial model earpiece S104B. Thus, the initial model earpiece can be modified to a first model earpiece based on the initial pressure parameters and/or the initial contact force parameters.

Further, the method can include determining coupling data indicative of a coupling of the model earpiece S106. The determining coupling data S106 can include analyzing comfort criteria of the first model earpiece based on one or more first pressure parameters associated with the first model earpiece and/or based on one or more first contact force parameters associated with the first model earpiece S106A.

The one or more first pressure parameters and the one or more first contact force parameters can be used to increase the probability that the earpiece would comfortably fit the user. However, the parameters can also have effects on the usefulness of the earpiece itself. For examples, if the earpiece had insufficient contact forces or pressure, the device may not fit properly into a user's ear and thus not have full capabilities for helping to alleviate hearing loss.

The determining coupling data S106 can include modelling ear canal dynamics of the first model earpiece S106B. For example, the ear canal dynamics can include jaw opening and closing performance, chewing performance, and head movement performance. For example, dynamic 3D modeling and FEA can be performed on a user performing normal functions that may affect the earpiece.

Additionally, the method can include evaluating the earpiece configuration based on the coupling data S108. In certain methods 100, the evaluating an earpiece configuration S108 can include validating the first model earpiece with the user S108A, and in accordance with the first model earpiece being validated providing the output of the evaluation. The evaluating the earpiece configuration S108 can also include determining whether the coupling data satisfies one or more criteria S108B. The evaluating can lead to modifying the model earpiece to a first model earpiece S107. For example, the model earpiece may be modified based on the one or more contact force parameters and/or the one or more pressure parameters.

Once a model earpiece has been approved, such as the original model earpiece, the first model earpiece, etc., the method can continue to the providing a personalized earpiece based on an output of the evaluation S110. Advantageously, the method can be performed prior to providing an initial earpiece to the user. Thus, the user does not have to waste time with uncomfortable fitting earpieces.

Figure 3:
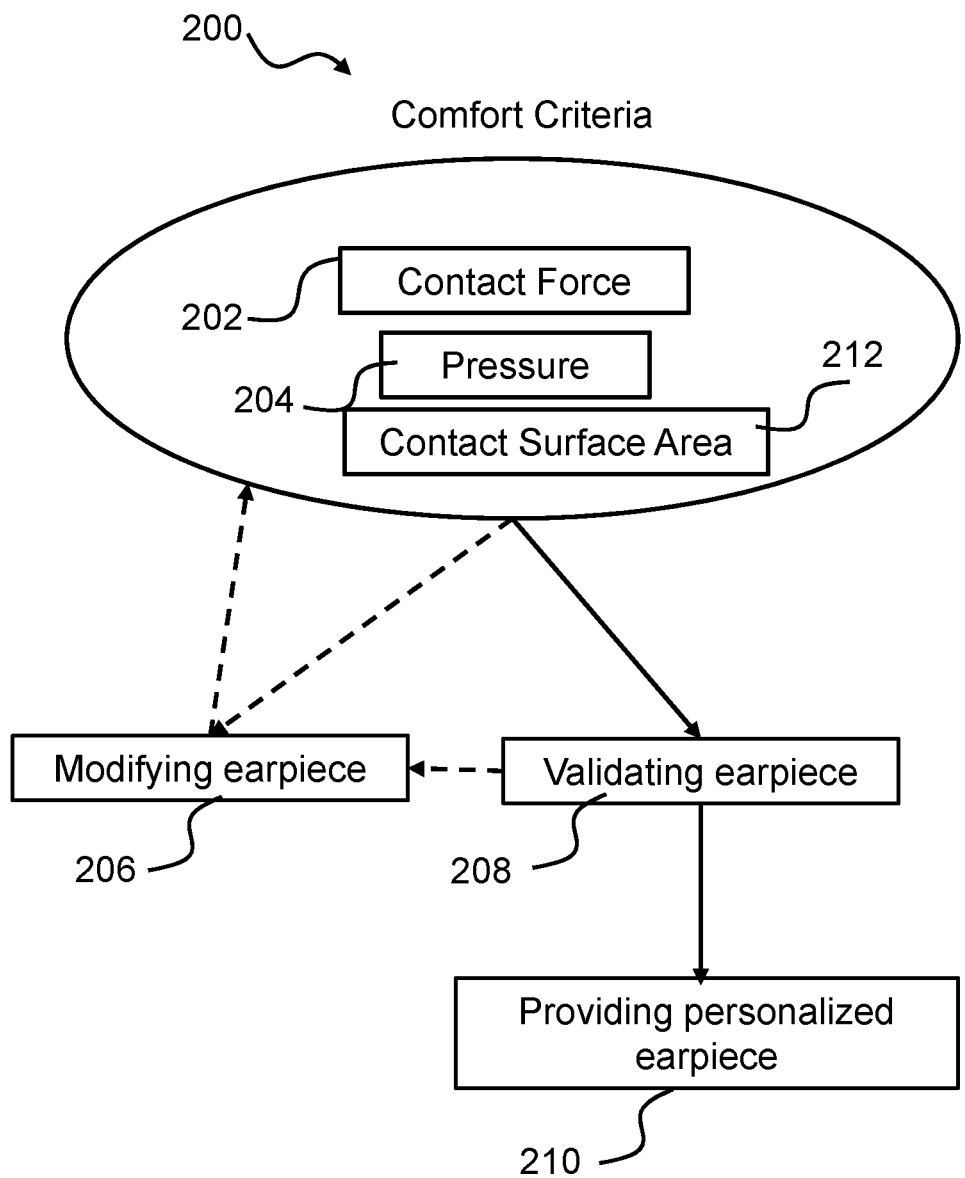
FIG. 3 illustrates parameters which can be used in the method of FIG. 1 and/or FIG. 2.

FIG. 3 illustrates certain aspects of the methods disclosed herein. As discussed the method can include determining coupling data by analyzing comfort criteria 200 of the first model earpiece, or other model earpieces. The comfort criteria 200 can be based on one or more of the contact force parameters 202 and the pressure parameter 204 and the contact surface area parameters 212.

If the comfort criterion 200 is not satisfied by a given earpiece, the method can include modifying the earpiece 206 to form a new model earpiece, such as a first, second, third, etc. model earpiece. The comfort criterion 200 of the new earpiece can be analyzed.

If the comfort criterion 200 are satisfied by a given earpiece, the method can move to validating the earpiece 208 by a user. If the user approves, the method can move on, such as to the providing a personalized earpiece 210. If the user does not approve, the earpiece can be further modified 206.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa.

It may be appreciated that FIGS. 1-3 comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in the order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES 100 method
S102 obtaining 3D scan data of an ear
S102A performing a 3D scan on an impression of the ear
S102B performing a 3D scan on the ear
S104 obtaining a model earpiece with an earpiece configuration via FEA
S104A determining one or more initial contact force parameters
S104B determining one or more initial pressure parameters
S106 determining coupling data
S106A analyzing comfort criteria of the first model earpiece
S106B modelling ear canal dynamics of the first model earpiece
S107 modifying to first model earpiece
S108 evaluating the earpiece configuration
S108A validating the first model earpiece with the user
S108B determining whether the coupling data satisfies one or more criteria
S110 providing a personalized earpiece
200 comfort criteria
202 contact force parameters
204 pressure parameters 206 modifying earpiece
208 validating earpiece
210 providing personalized earpiece
212 contact surface area

The invention claimed is:

1. A method of predictive design of an earpiece for a user, the method comprising:
    electronically obtaining 3D scan data of an ear;
    electronically obtaining a model earpiece with an earpiece configuration based on the 3D scan data;
    electronically determining coupling data by an electronic device, wherein the coupling data is determined prior to providing an initial earpiece to the user;
    evaluating the earpiece configuration based on the coupling data and one or more criteria, at least one of the one or more criteria indicates a probability of comfort, wherein the coupling data comprises a force parameter, a pressure parameter, a contact surface area parameter, or any combination of two or more of the foregoing;
    provisioning personalized earpiece information after the act of evaluating is performed; and
    outputting the personalized earpiece information to enable a manufacturer or a technician to make the earpiece based on the personalized earpiece information, such that the earpiece is personalized for the user.

2. The method according to claim 1, wherein the method is performed prior to providing the initial earpiece to the user.

3. The method according to claim 1, wherein the 3D scan data is based on a 3D scan of an impression of the ear.

4. The method according to claim 1, wherein the 3D scan data is based on a 3D scan of the ear.

5. The method according to claim 1, wherein the 3D scan data comprises front pinna data, back pinna data, and ear canal data.

6. The method according to claim 1, wherein the act of electronically obtaining the model earpiece comprises obtaining an initial model earpiece based on an analysis of the 3D scan data.

7. The method according to claim 6, wherein the initial model earpiece is the model earpiece.

8. The method according to claim 6, wherein the act of electronically obtaining the model earpiece comprises modifying the initial model earpiece.

9. The method according to claim 6, wherein the act of electronically obtaining the model earpiece comprises modifying the initial model earpiece to obtain a first model earpiece.

10. The method according to claim 9, wherein the first model earpiece is the model earpiece.

11. The method according to claim 1, wherein the one or more criteria comprises a comfort criterion.

12. The method according to claim 9, further comprising obtaining validation information after the first model earpiece has been validated with the user.

13. The method according to claim 1, wherein the act of electronically determining the coupling data comprises modelling one or more ear canal dynamics.

14. The method according to claim 13, wherein the one or more ear canal dynamics includes jaw opening and closing performance, chewing performance, head movement performance, or a combination of the foregoing.

15. The method according to claim 1, wherein the act of evaluating comprises determining whether the coupling data satisfies the one or more criteria, the one or more criteria including a first criterion.

16. The method according to claim 15, further comprising including the earpiece configuration into a fine-tuning data set if the coupling data does not satisfy the first criterion.

17. The method according to claim 1, wherein the act of electronically obtaining the model earpiece comprises performing an analysis of the 3D scan data, and wherein the analysis of the 3D scan data comprises a finite element analysis of the 3D scan data.

18. The method according to claim 1, wherein the personalized earpiece comprises a digital personalized earpiece.

19. The method according to claim 1, wherein the personalized earpiece information comprises a result from the act of evaluating.

20. An electronic device comprising one or more processors, memory, and an interface, wherein the one or more processors are configured to:
    electronically obtain 3D scan data of an ear;
    electronically obtain a model earpiece with an earpiece configuration based on the 3D scan data;
    electronically determine coupling data by the electronic device, wherein the electronic device is configured to determine the coupling data prior to providing an initial earpiece to a user;
    evaluate the earpiece configuration based on the coupling data and one or more criteria, at least one of the one or more criteria indicates a probability of comfort, wherein the coupling data comprises a force parameter, a pressure parameter, a contact surface area parameter, or any combination of two or more of the foregoing;
    provision personalized earpiece information after the earpiece configuration is evaluated; and
    output the personalized earpiece information to enable a manufacturer or a technician to make an earpiece based on the personalized earpiece information, such that the earpiece is personalized for the user.

* * * * *